July 11, 1967 R. H. HAYWARD 3,330,369
GAS-CUSHION VEHICLES
Filed May 24, 1965 2 Sheets-Sheet 2
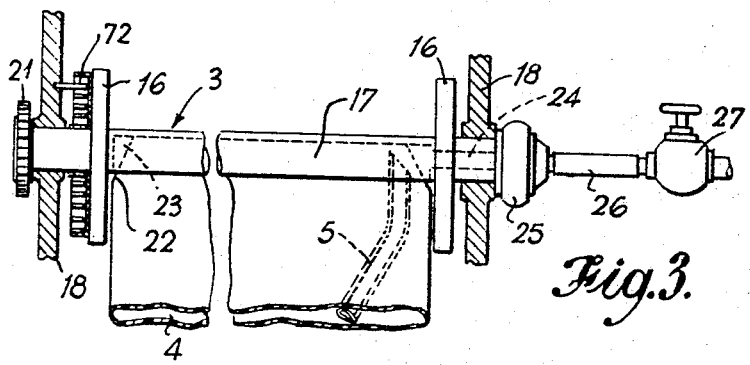
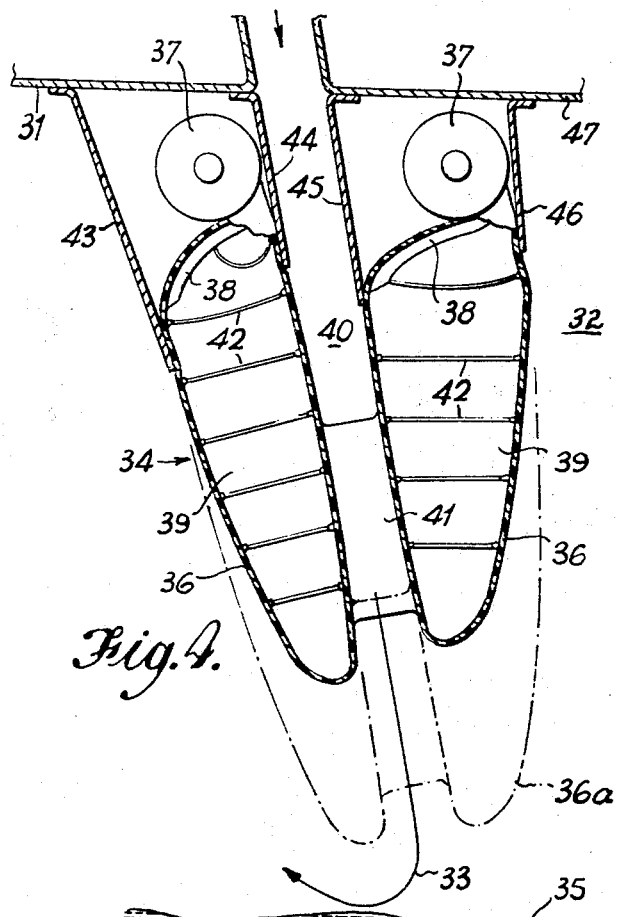
INVENTOR
R. H. HAYWARD
BY
Cameron, Kerkam & Sutton
ATTORNEYS

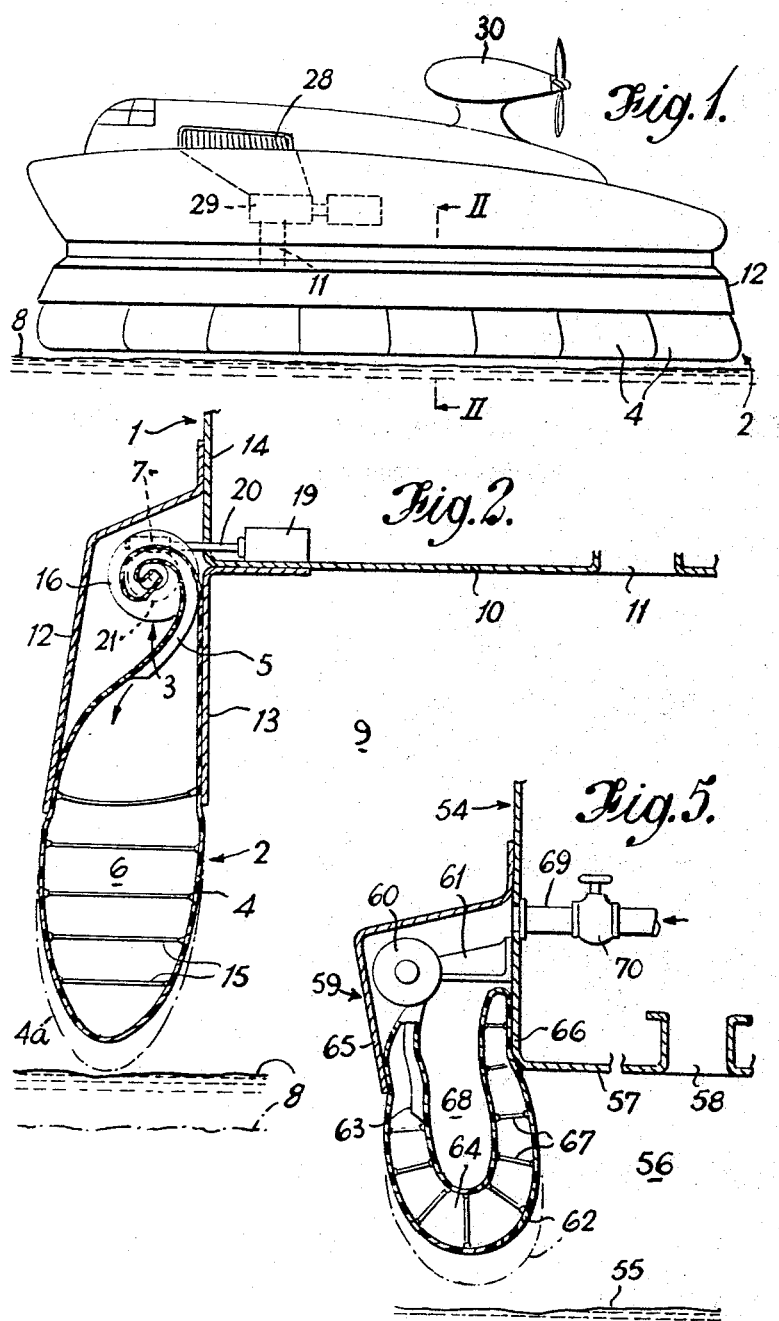

United States Patent Office 3,330,369
Patented July 11, 1967

3,330,369
GAS-CUSHION VEHICLES
Ralph Harold Hayward, Mount Waverley, Victoria, Australia, assignor to Hovercraft Development Limited, London, England, a British company
Filed May 24, 1965, Ser. No. 458,275
Claims priority, application Great Britain, May 28, 1964, 22,204/64
8 Claims. (Cl. 180—7)

This invention relates to gas-cushion vehicles, that is to say, to vehicles of the kind which, in operation, are supported above a surface by at least one cushion of pressurised gas (usually air) formed and contained beneath the vehicle, and is concerned with vehicles wherein the cushion(s) is contained, at least in part, by at least one wall structure projecting down below the body of the vehicle.

Unless the vehicle is expected to operate over a substantially smooth surface, it is a desired feature of a wall structure to be flexible and this can be achieved by making at least part of the wall hollow and of flexible material and then inflating it.

Certain operating conditions, for example, when operating over water surfaces and thus encountering differing wave heights in the change from harbour to open sea conditions, make it desirable for the height of such a wall member to be readily adjustable.

According to the invention, a gas-cushion vehicle has its supporting cushion contained, at least in part, by a height-adjustable wall structure projecting downwardly below the body of the vehicle, said wall structure comprising a reel mounted for rotation relative to the vehicle body, a hollow, inflatable wall member at least part of which is wound on said reel and means for supplying inflating fluid to the interior of the wall member.

Three embodiments of the invention will now be described by way of example with reference to the accompanying drawings wherein:

FIGURE 1 is a side view of a gas-cushion vehicle according to the first embodiment, FIGURE 2 is a section, to an enlarged scale, taken on the lines II—II of FIGURE 1, FIGURE 3 is an enlarged detail of FIGURE 2, FIGURE 4 is a fragmentary side view, partly in medial section, of the second embodiment, and FIGURE 5 is a fragmentary side view, partly in medial section, of the third embodiment.

Referring to FIGURES 1 and 2, a gas-cushion vehicle is supported above a surface 8 by a cushion 9 of pressurised gas (air) formed beneath the bottom 10 of the vehicle, and contained thereunder by a height-adjustable wall structure 2 projecting downwardly below the periphery of the vehicle body. The wall structure 2 comprises a reel 3 mounted on the vehicle, a hollow, inflatable wall member 4 part of which is wound on the reel 3, means including an inflating tube 5 for supplying inflating fluid to the interior 6 of the wall member 4 when said part is wound on the reel 3.

In greater detail, the vehicle 1 is of the so-called "plenum chamber" type, atmospheric air being drawn in through side intakes 28 and fed under pressure by an engine-driven compressor 29 through a duct 11 to below the vehicle 1, whence air surplus to the amount required to maintain the cushion 9 escapes through the peripheral clearance between the bottom of the wall structure 2 and the surface 8 beneath. The vehicle is propelled over the surface 8 by an airscrew unit 30.

The wall member 4 is of elongate form, made up from rubberised sheets and the inflating tube 5 is made of hard rubber bonded to the upper interior of the wall member. Sheet metal guides 12, 13 are attached to the side 14 and the bottom 10 of the vehicle 1 and constrain that portion of the wall member 4 forming the upper part of the wall structure 2 to substantially vertical movement. Internal surfaces of the guides 12, 13 are coated with polytetrafluorethylene, commonly known as P.T. F.E., to reduce friction between the wall member and the guides. The wall member 4 is constrained to a predetermined form by internal tie members in the form of cords 15 attached to the walls of the wall member.

Referring now to FIGURE 3, the reel 3 comprises a pair of spaced guide flanges 16 mounted on a shaft 17. The shaft 17 is rotatable in bearings 18 and is driven, through an electric motor 19 and worm shaft 20 (FIGURE 2), by a worm wheel 21 mounted on one end of the shaft.

That part of the shaft 17 between the flanges 16 locates the upper end 23 of the wall member 4 and is provided with a lateral slot 22 for accommodation of said upper end. (For clarity, FIGURE 3 illustrates the wall member 4 immediately after insertion of its upper end 23 in the slot 22; before any inflation takes place, the reel 3 is rotated so that a short length of the member 4 is wound on the reel.) A drilling 24 in the right hand end of the shaft 17 provides fluid connection, by way of a rotary coupling 25, between the slot 22 and a pressure hose 26 with associated control valve 27 connected (by means of a tapping) to the compressor 29.

Before operation of the vehicle 1, the wall member 4 is fitted to the spool 3 and the spool 3 rotated so as to fully wind on the member. To extend the wall structure 2, the spool 3 is rotated slowly to unwind the wall member 4 and simultaneously the unwound portion of the member is inflated by feeding high pressure pressurised air to the inflating tube 5 by way of the hose 26, drilling 24 and slot 22. (The rigidity of the inflating tube 5 prevents crushing of the part of the tube attached to the wound-on part of the wall member 4 and thus allows free passage of inflating air.) To further extend the bottom of the member 4 (as indicated by the dotted lines 4a), the spool 3 is further rotated whilst the supply of inflating air is maintained.

Stiffness of the wall member 4 can be varied by varying the inflation pressure and this is achieved by adjustment of the valve 27.

Referring now to FIGURE 4, a vehicle 31 is shown of the kind wherein the lower part of the periphery of its supporting cushion 32 is contained in part by a curtain 33 of moving fluid and in part by an inflatable wall structure 34 depending beneath the vehicle and forming a flexible nozzle through which pressurised air is directed towards the surface 35 beneath the vehicle to provide the curtain 33.

The wall 34 comprises a pair of hollow, inflatable wall members 36 of elongate form, the upper parts of which are wound on reels 37 mounted on the vehicle 31. Means including inflating tubes 38 are provided for supplying inflating fluid to the interiors 39 of the members 36, and reel driving means (not shown, but identical to the driving means 7 of FIGURE 1) are also provided so as to wind or unwind the wall members 36.

The wall members 36 are spaced apart to define a space 40 which forms a nozzle passageway. Opposed faces of the members 36 are tied together by webs 41. The wall members 36 are constrained to predetermined forms by internal tie members in the form of cords 42. The wall members 36 are of rubberised fabric and the inflating tubes 38 are of hard rubber bonded to the upper interiors of the members. Sheet metal guides 43, 44, 45, 46 are attached to the bottom 47 of the vehicle 1 and contain the portions of the members 36 forming the upper parts of the walls 34. Internal surfaces of the guides 43, 44, 45, 46 are coated with P.T.F.E. to reduce friction between the members 36 and the guides.

The form of the reels 37 is identical to that of the reel 3 of FIGURE 2 and the upper ends of the wall members 36 the same as that of the wall members 4 of the same figure. As stated above, the reels 37 are rotated by means identical to the means 7 of FIGURES 1 and 2.

The wall members 36 are extended by appropriate rotation of the reels 37, whilst maintaining a supply of inflating fluid (air) to the inflating tubes 38. The dotted lines 36a give an indication of the degree of possible extension of the height of the wall structure 34. The webs 41 are preferably positioned to limit upward travel of the wall members 36, by contact with the guide 45.

The reels 37 are preferably interconnected so that they rotate together. They can, of course, be driven separately and if the webs 41 do not allow a sufficient degree of relative movement between wall members, the webs 41 can be dispensed with.

As in the previous embodiment, stiffness of the wall members 36 can be varied by varying the inflation pressure. The inflation pressures in each of the members 36 can, of course, differ if so required.

Referring now to FIGURE 5, a "plenum chamber" vehicle 54 of form generally similar to the vehicle 1 of FIGURES 1 and 2 is supported above a surface 55 by a cushion 56 of pressurised air formed and contained beneath the bottom 57 of the vehicle, the cushion air being supplied through a duct 58.

The cushion 56 is contained, at least in part, by a wall structure 59 which comprises a reel 60 mounted, by way of a bracket 61, on the body of the vehicle, an inflatable wall member 62 of elongate form, the upper end of which is wound on the reel 60, and means including an inflating tube 63 for supplying inflating air to the interior 64 of the wall member 62. The end of the wall member 62 which is not wound on the reel 60 is anchored to the side 66 of the vehicle 54 so that the wall member assumes a substantially U like vertical cross-section.

The wall member 62 is of rubberised fabric and the inflating tube 63 of hard rubber bonded to the interior of the wall member. A sheet metal guide 65 is attached to the side 66 of the vehicle body and, together with the vehicle body, constrain the portions of the wall member 62 forming the upper part of the wall structure 59.

The lower interior surface of the guide 65 is coated with P.T.F.E. to reduce friction between the wall member 62 and the guide. The wall member 62 is provided with internal tie members in the form of cords 67 which constrain the walls of the wall member. The reel 60 is of a form identical to the reel 3 of FIGURE 2 and is rotated in the same manner. Rotation of the reel 60 in a clockwise or anti-clockwise direction results in an increase or decrease in the effective height of the wall structure 59. The guide 65 and wall member 62 bound a space 68 which can be pressurised, if required, by air supplied through a control duct 69 provided with a control valve 70. Pressurisation can vary the "stiffness" of the wall member 62 and can also assist rotation of the reel 60 when an increase in wall height is required.

Modifications of the embodiments include the unwinding of the inflatable wall members off their reels by means only of the admission to their interiors of high pressure inflation fluid. In this modification and with reference to FIGURE 3, the reels are adapted to allow this by disconnection of the driving means 19, 20, and biasing the reels, for example, by springs 72 coiled around the shaft 17 and anchored to bearings 18 so that they reverse rotation to return the wall members to their original positions when the inflation pressure of the structures is reduced. Furthermore, the guides can be made of flexible material, such as rubber, instead of rigid metal.

I claim:
1. A gas-cushion vehicle having a body, means for forming at least one cushion of pressurised gas in a space beneath the vehicle body for supporting the vehicle above a surface when the vehicle is in operation, and a height-adjustable wall structure projecting downwardly below the body of the vehicle for at least partially containing said cushion, said wall structure comprising a reel mounted for rotation relative to the vehicle body, a hollow, inflatable wall member at least part of which is windable on said reel, and means for supplying inflating fluid to the interior of the wall member.

2. A vehicle as claimed in claim 1 wherein said reel is hollow and said means for supplying inflating fluid to the interior of the wall member include a tube member disposed within the wall member and connecting the interior of the wall member with the hollow portion of the reel, a source of inflating fluid, and means connecting said source of inflating fluid with said hollow portion.

3. A vehicle as claimed in claim 1 wherein said reel is adapted to allow unwinding of said wall structure off said reel by increase in the inflation pressure of said wall member.

4. A vehicle as claimed in claim 3 wherein said reel is biased so as to reverse rotation when the inflation pressure is reduced.

5. A vehicle as claimed in claim 1 including a further wall structure spaced from the the first-mentioned wall sturucture, the space between the two wall structures defining a nozzle passageway, and means for supplying a pressurised fluid to the upper end of said passageway so that said fluid issues from the nozzle in the form of a fluid curtain.

6. A vehicle as claimed in claim 1 wherein the end of the wall member remote from the reel is attached to the vehicle body so that the wall member has a vertical cross-section of substantially U form.

7. A vehicle as claimed in claim 6 including means for pressurising the space enclosed by the wall member.

8. A vehicle as claimed in claim 1 including means for causing a curtain of moving fluid to issue from the lowermost portion of the wall member.

References Cited

UNITED STATES PATENTS

| | | | |
|---|---|---|---|
| 2,448,054 | 8/1948 | Seckel | 296—107 |
| 3,182,740 | 5/1965 | Cockerell | 180—7 |
| 3,207,113 | 9/1965 | Tattersall | 180—7 X |
| 3,240,282 | 3/1966 | Taylor | 180—7 |
| 3,243,005 | 3/1966 | Jones et al. | 180—7 |

A. HARRY LEVY, *Primary Examiner.*